United States Patent

Oliver et al.

[11] 4,135,087
[45] Jan. 16, 1979

[54] METHOD AND APPARATUS FOR NEUTRON INDUCED GAMMA RAY LOGGING FOR LITHOLOGY IDENTIFICATION

[75] Inventors: Donald W. Oliver; Richard B. Culver, both of Houston, Tex.

[73] Assignee: Dresser Industries, Inc., Dallas, Tex.

[21] Appl. No.: 829,397

[22] Filed: Aug. 31, 1977

[51] Int. Cl.$^2$ ............................................. G01V 5/00
[52] U.S. Cl. .................................... 250/270; 250/262
[58] Field of Search .............. 250/261, 262, 269, 270

[56] References Cited

U.S. PATENT DOCUMENTS

| | | | |
|---|---|---|---|
| 3,780,301 | 12/1973 | Arnold et al. | 250/270 |
| 3,780,302 | 12/1973 | Smith, Jr. et al. | 250/270 |
| 3,886,355 | 5/1975 | Culver | 250/270 |

Primary Examiner—Alfred E. Smith
Assistant Examiner—Janice A. Howell
Attorney, Agent, or Firm—Albert M. Crowder, Jr.

[57] ABSTRACT

A pulsed neutron generator in a well logging instrument is pulsed at a clock frequency of 20 KHz. Inelastic scatter gamma rays are detected during a first time interval coinciding with the neutron source being on and capture gamma rays are measured during a second interval subsequent to the end of each neutron burst. Only a single detected pulse, assuming detection occurs, is transmitted during each of the two detection intervals. Sync pulses are generated in the well logging instrument scaled down to a frequency of 200 Hz for transmission to the earth's surface. At the earth's surface, the scaled-down sync pulses are applied to a phase-locked loop system for regenerating the sync pulses to the same frequency as that of the clock frequency used to pulse the neutron source and to open the detection gates in the borehole instrument. The regenerated sync pulses are used in the surface instrumentation to route the pulses occurring in the inelastic interval into one section of a multichannel analyzer memory and the pulses occurring in the capture interval into another section of the multichannel analyzer. The use of memory address decoders, subtractors and ratio circuits enables both a carbon/oxygen ratio and a silicon/calcium ratio to be struck, substantially independent of the chlorine content of the borehole and formation.

10 Claims, 9 Drawing Figures

METHOD AND APPARATUS FOR NEUTRON INDUCED GAMMA RAY LOGGING FOR LITHOLOGY IDENTIFICATION

BACKGROUND OF THE INVENTION

This invention relates generally to radiological well logging methods and apparatus for investigating the subsurface earth formations traversed by a borehole and, more specifically, relates to an improved system for high frequency pulsed neutron gamma ray logging methods and apparatus wherein gamma rays resulting from neutron inelastic scattering and thermal neutron capture are selectively detected and the spectral distribution of the gamma rays is determined.

The selective detection of characteristic gamma rays emanating from earth elements undergoing neutron bombardment is appreciated by those skilled in the art as a method for identifying such elements. More specifically, the detection of gamma rays from carbon, oxygen, silicon, calcium and certain other elements enables the identification of the general rock types in formations traversed by boreholes and the determination of the presence or absence of hydrocarbons within their pore spaces.

Various radioactivity well logging techniques have been used in the prior art to provide lithology information and infer the presence of fluid in a subsurface formation. Basically, these techniques involve irradiating the formation of interest with neutrons and then determining the effect of formation constituents on the neutrons by detecting scattered neutrons or the secondary gamma rays which return to the borehole from the irradiated formation.

One important measurement that can be made is the determination of the ratio of the carbon and oxygen gamma rays resulting from inelastic collisions of fast neutrons with formation elements. This C/O ratio is useful for determining the extent of hydrocarbon saturation in formation fluids if the relative amounts of silicates and carbonates in formation rocks can be determined.

Accordingly, it has been proposed in the prior art to measure a portion of the inelastic and/or capture gamma ray spectra resulting from neutron irradiation of the elements surrounding the borehole, and to derive an indication of the silicon (Si) and calcium (Ca) content of the constituent rocks. In particular, it has been proposed to derive a ratio of the number of counts from selected portions of the spectra to obtain a ratio proportional to the relative amounts of Si and Ca present in formations traversed by a borehole. Deriving such a ratio provides a relative indication of the amounts of these elements present in formation rocks, information that is essential for reliable interpretation of C/O measurements.

Previously, the prior art measurement of Si/Ca ratios has suffered from two major problems. First, the measurement using gamma rays from the capture of thermal neutrons in the formation constituents is highly sensitive to formation and borehole water salinity, due to the large cross section for thermal neutron capture of the chlorine (Cl) nucleus. The effect of the Cl is to depress the Si/Ca ratio and cause high salinity, high porosity water sands to give approximately the same response as limestone. The energy intervals used in the method of the prior art were selected to minimize this chlorine dependency, but were effective only in low to medium porosities and moderate water salinities. This chlorine dependence complicates the analysis of complex lithologies.

One solution to the salinity problem that has been proposed in the prior art, for example, in U.S. Pat. No. 3,780,301, is to ratio the Si and Ca gamma rays resulting from inelastic collisions of energetic neutrons with formation elements. This measurement is substantially independent of water salinity but the ratios so derived show a relatively small difference between sandstone and limestone, again making the identification of mixed lithologies difficult.

Accordingly, it is an object of the present invention to provide new and improved methods and apparatus for identifying constituent elements in a formation traversed by a borehole and, more specifically, to provide improved methods and apparatus for deriving the ratio of Si and Ca gamma rays resulting from the capture of thermal neutrons.

It is also an object of the present invention to derive such a ratio in a manner that provides clear delineation between sandstone and limestone. Further, it is an object of the present invention to provide new and improved methods and apparatus for deriving a ratio of gamma rays, induced by the capture of thermal neutrons in an earth formation, which is substantially independent of water salinity.

The objects of the invention are accomplished, generally, by method and apparatus which generates first electrical signals functionally related to the summed gamma rays resulting from the captured thermal neutrons within a pair of non-contiguous energy windows in the thermal neutron capture spectra to provide an indication of the calcium and which generates second electrical signals functionally related to the gamma rays resulting from the captured thermal neutrons within a third energy window in the thermal neutron capture spectra intermediate the two calcium windows to provide an indication of the silicon.

These and other objects, features and advantages of the present invention will be more readily understood by those skilled in the art from a reading of the following detailed specification and drawing, in which:

Figure 1:
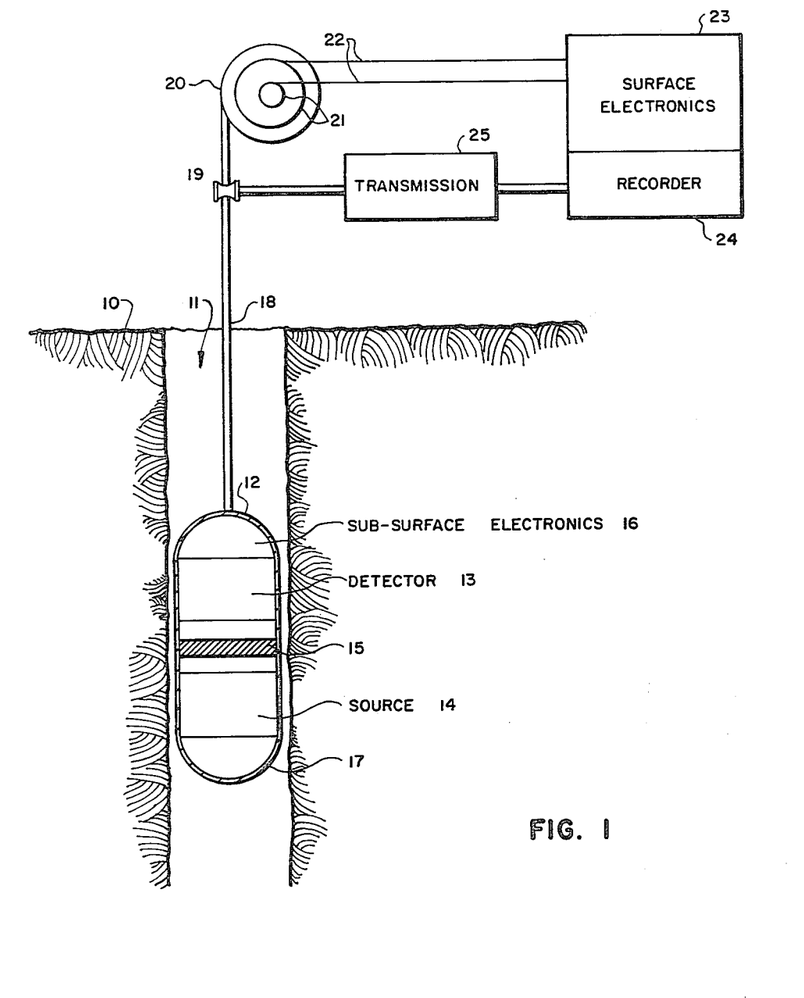
FIG. 1 is a side elevation, partly in cross section, of a borehole logging instrument in operative position and its associated surface circuitry and related equipment.

Referring now to the drawing in more detail, particularly to FIG. 1, there is illustrated schematically a radioactivity well surveying operation in which a portion of the earth 10 is shown in vertical section. A well 11 penetrates the earth's surface and may or may not be cased. Disposed within the well is subsurface instrument 12 of the well logging system. Subsurface instrument 12 comprises a detecting system 13 and a pulsed neutron source 14. Cable 18 suspends the instrument in the well and contains the required conductors for electrically connecting the instrument with the surface apparatus. The cable is wound on or unwound from drum 20 in raising and lowering the instrument 12 to traverse the well.

In making a radioactivity log of the well, instrument 12 is caused to traverse the well. Thereby neutrons from source 14 irradiate the formations surrounding the borehole and radiations influenced by the formations are detected by the detecting system 13. The resultant signals are sent to the surface through cable 18. Through slip rings 21 on the end of the drum, the signals are conducted by means of conductors 22 to the surface electronics 23, where such signals are processed and then recorded on the recorder 24 as explained in more detail hereinafter. Recorder 24 is driven through a transmission 25 by measuring reel 19 over which the cable 18 is drawn so that recorder 24 moves in correlation with depth as the instrument 12 traverses the well. The elements are shown diagrammatically, and it is to be understood that the associated circuits and power supplies are provided in a conventional manner. It is also to be understood that the instrument housing 17 will be constructed to withstand the pressures and mechanical and thermal abuses encountered in logging a deep well and provide adequate space within it to house the necessary apparatus and permit the transmission of radiation through it. The subsurface signals are processed in the subsurface electronics 16, described in greater detail hereinafter.

In a well logging operation such as is illustrated by the apparatus of FIG. 1, the neutron source and detector in the subsurface instrument 12 are separated from the surface processing and recording equipment 23 by as much as four to five miles of logging cable which carries power and signals. Synchronization pulses must be transmitted along with the detector signals to provide the means for synchronizing the surface processing equipment with the subsurface generating and detecting system.

The sync pulse received at the surface of the 20,000 odd feet of logging cable commonly encountered in the well logging industry has a width of about ten microseconds due to the poor high frequency response to the cable. At low repetition frequencies, for example, 2,000 Hz or less, the transmission of a sync pulse for each neutron burst is not particularly difficult; however, at high repetition rates, for example, 20 KHz, the sync pulse represents an appreciable amount of the repetition period. If, however, the sync pulses are scaled and transmitted only one or two percent of the time, a significant improvement results since the sync is regenerated at the surface by use of a phase coherent, phase-locked loop.

Figure 2:
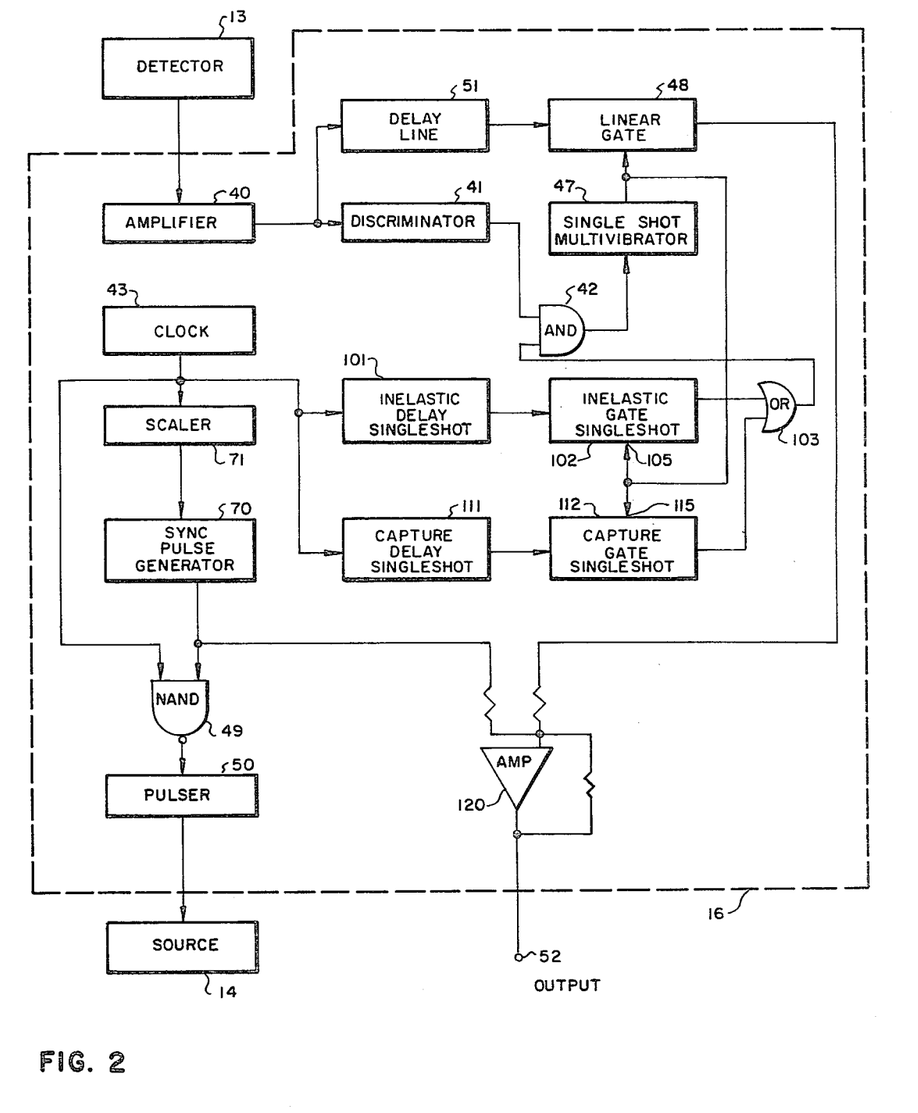
FIG. 2 is a block diagram of the subsurface circuitry according to the present invention.

FIG. 2 illustrates the subsurface apparatus and circuitry for generating the neutron source signals, the radioactivity detector signals, and the scaled sync signals for transmission to the earth's surface.

Referring now to FIG. 2, there is illustrated in block diagram the subsurface electronics section 16, as connected to the detector 13. The detector 13 is a scintillation counter arranged for gamma ray spectral analysis in accordance with the prior art. In a preferred embodiment, it is a NaI (Tl) crystal having a 2½ inch diameter with a 4 inch length, such crystal being coupled to a Model No. 4523 photomultiplier tube available from The Radio Corporation of America. Such a crystal-photomultiplier combination may have a resolution of 7.5% to 8.5% for the 660 Kev cesium 137 peak. The detector is mounted in a Dewar flask or is otherwise protected from high temperatures encountered in boreholes. The output of the detector 13 combination is coupled into an amplifier 40 within the subsurface electronics section 16. The output of amplifier 40 is coupled to a discriminator 41 which in turn is coupled into one of the two inputs of the AND gate 42. The discriminator 41 is used to remove pulses having amplitudes below a selectable threshold value which might otherwise cause pile-up on the transmission line normally connected to the output terminal 52. A setting of 400 kev is generally suitable for this purpose. The output of the discriminator 41 is AND gated in the AND gate 42 with a voltage pulse having a nominal width of ten microseconds from the OR gate 103. The output of the AND gate 42 triggers the single shot multivibrator circuit 47 which is nominally set to have a 1.6 microsecond wide pulse output for controlling the linear gate 48. The output from clock 43 triggers the inelastic delay single shot multivibrator circuit 101 which in turn triggers the inelastic gate width single shot multivibrator circuit 102. These circuits synchronize the opening of linear gate 48 with the pulsing of the neutron source to provide the inelastic gating interval. Multivibrator 102 is a retriggerable type with a "clear" input 105. The operation of the circuit is such that if a trigger pulse is applied before the end of the cycle initiated by a previous trigger pulse, the cycle time will begin anew. Also, after the circuit is initiated by a trigger pulse, the Q output will remain high until the end of the cycle time or until a "clear" pulse is applied, whichever occurs first. The output of single shot 102 is coupled to one input of OR gate 103. The "clear" input 105 of single shot 102 is driven by the output of single shot 47. The result of this "clear" signal is to reset inelastic gate single shot 102 as soon as the first gamma ray with energy above the discriminator threshold is detected. By using a multivibrator circuit with a "clear" function for gate single shot 102, a dual function is performed. Firstly, the single shot provides the gate width timing signal for determining the maximum length of the inelastic detection gate, nominally 10 μsec; and secondly, it provides for terminating the gate when the first gamma ray pulse above the discriminator theshold is detected, a function performed by a J-K flip-flop in U.S. Pat. No. 3,739,172.

The output from clock 43 is also connected to capture delay single shot 111 which in turn drives capture width single shot 112 which also has a "clear" input and whose output is coupled to the second input of OR gate 103. The "clear" input terminal 115 of single shot 112 is also driven by the output of single shot 47. The clock 43 is also synchronized with the neutron source 14. The pulse from the clock 43 actuates, by means of a NAND circuit 49, a high voltage pulser 50 arranged to cause the neutron output of source 14 to pulse at the clock frequency, for example, as described in U.S. Pat. No. 3,309,522.

The amplified pulses from the amplifier 40 are also coupled into a delay line 51, which is nominally set to cause a delay of 0.4 microseconds, the output of which is coupled into the linear gate 48.

The output of the clock circuit 43 is also coupled into a scaler circuit 71 which produces output pulses at a frequency scaled down from that of the clock frequency. In the preferred embodiment, the clock 43 operates at a frequency of 20 KHz and the scaler circuit 71 produces pulses at a frequency of 200 Hz. The output of the scaler 71 is coupled to a sync pulse generator 70 which shapes the pulses for application to the line amplifier 120 and NAND gate 49. Thus, the scaled sync pulses are generated at a frequency which is 1% of that of the clock frequency 43. The scaled sync pulses from the sync pulse generator 70 are coupled into the second input of the NAND gate 42. Thus, whenever a sync pulse appears on the NAND gate 49 input coincident with a pulse from the clock circuit 43, there is no output produced from the NAND gate 49 and the neutron source 14 is not pulsed. In short, the source 14 pulses every time the clock 43 pulses except for those times when the scaled sync pulses are produced.

In addition to the scaled sync pulses, the output from linear gate 48 is coupled to the line amplifier 120 which in turn is coupled to line 18 by connection to terminal 52.

In the operation of the circuitry of FIG. 2, it should be readily apparent that the circuitry involved with the single shot 111 and the single shot 112 are duplicates of the circuitry involving the single shot 101 and the single shot 102. The difference lies in the time constant of each circuit which allows there to be two gating intervals which are separated in the preferred embodiment by a delay of 25 microseconds from the beginning of the first to the beginning of the second. As will be explained hereinafter, the first gating interval occurs during the time the neutron source is turned on and allows for the detection of radioactivity resulting from inelastic scattering and the second gating interval allows for the measurement of neutron capture resulting from the pulsing of the neutron source.

In the operation of the circuitry of FIG. 2, it should be appreciated that the first detector pulse exceeding the threshold of the discriminator 41 and commencing within the time interval of the gate pulse from the OR gate 103 is passed by the linear gate 48 to the amplifier 120. It should also be appreciated that by AND gating the 10 microsecond pulse from the OR gate with the discriminator output to provide the trigger for the single shot multivibrator which in turn controls the opening of the linear gate, rather than triggering the single shot multivibrator from the discriminator and gating the single shot multivibrator output and the OR gate pulse for the linear gate control signal, a detector pulse occurring near the end of the clock pulse interval is passed as a full width pulse instead of being chopped off as would otherwise occur. It should also be appreciated that the single shot 102 is reset on the leading edge of the output pulse from single shot 47, disabling AND gate 42. Thus, the first, and only the first, detector pulse occurring during the interval determined by single shot 102 is passed by the linear gate 48. Again, the pulse output from the linear gate 48 is full width, even should it occur late within the clock interval.

As hereinabove set forth, the circuitry associated with the second gating interval, i.e., the discriminator 41, the delay line 51 and the single shot circuit 111, etc., operates in a substantially identical manner with that above described except the delay of circuit 111, having a nominal time constant of 25 microseconds, enables the neutron capture radiation to be detected but again only a single pulse is passed occurring within the 10 microsecond gate interval determined by single shot 112. These pulses are passed through the linear gate 48 to the amplifier 120 and the pulse output from the linear gate 48 again is full width, even should it occur late within the gate interval.

Figure 3:
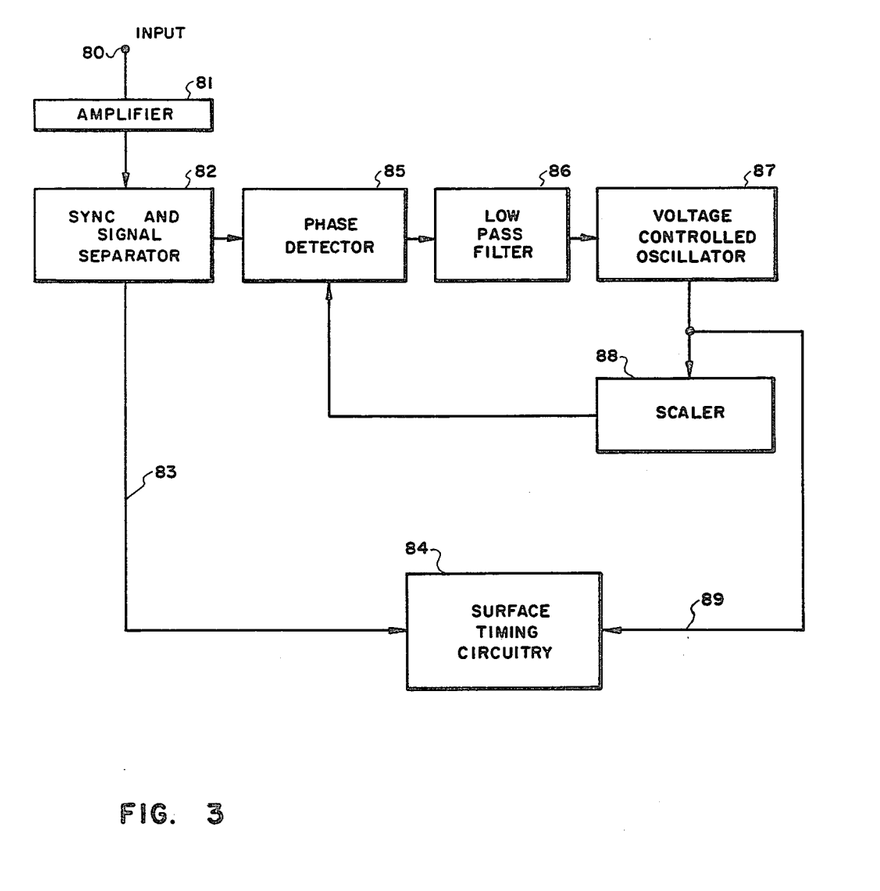
FIG. 3 is a block diagram of the surface circuitry according to the present invention.

Referring now to FIG. 3, the surface electronics circuitry 23 is illustrated in greater detail. The input terminal 80 in the surface electronics 23 which receives the pulses from the logging cable is coupled into an amplifier 81 whose output is coupled into a conventional sync and signal separator circuit 82. Quite obviously, if the sync and signal pulses are of opposite polarity, they can be separated by polarity-sensitive circuitry and if they are of the same polarity, they can be separated by a voltage discriminator circuit well known in the art. The preferred embodiment contemplates that the sync is transmitted with a polarity opposite from that of the detected pulses and the neutron source is not pulsed during the scaled sync transmission interval so that random coincidences do not annihilate the sync. If desired, the detector gate intervals can also be gated off during the sync transmission interval. The detector signals are coupled out of the sync and signal separator by conductor 83 into the surface timing circuitry 84 which is described in greater detail hereinafter.

The sync pulses from the sync and signal separator circuit 83 are coupled into a phase detector circuit 85, the output of which is coupled into a low pass filter 86 and then into a voltage controlled oscillator 87. The output of the voltage controlled oscillator 87 is coupled into a scaler 88 and also into the surface timing circuitry 84 by conductor 89. The output of the scaler circuit 88 is coupled back into phase detector circuit 85.

In the operation of the circuitry of FIG. 3, the combined sync and signal pulses are fed into the sync separator 82 where the sync pulses are separated and shaped to provide a reference frequency for the phase detector circuit 85. The phase detector output is filtered and used as the controlling voltage for the voltage controlled oscillator. The oscillator output is scaled by a frequency divider and fed to the second input of the phase detector circuit 85. When the loop is in lock, the voltage controlled oscillator output frequency is equal to the product of the reference input frequency and the scaler ratio. Thus, if the subsurface system runs at a clock frequency of 20 KHz and the sync pulses are scaled and transmitted at a 200 Hz rate, a scaler of 100 (scaler 88) will provide a 20 KHz output from the voltage controlled oscillator. This 20 KHz signal, now in phase lock with the subsurface clock, provides the synchronization between the subsurface and the surface systems. Thus, it can be seen that this system extends the upper usable pulsing frequency while maintaining a fairly safe margin against random coincidence between the sync pulses and the signal pulses. The design criteria for phase-locked loop systems is well known, and specially-designed integrated circuits are available for their implementation. See, for example, the *Phase-Locked Loop Data Book*, Second Edition, August, 1973, published by Motorola, Inc.

Figure 4:
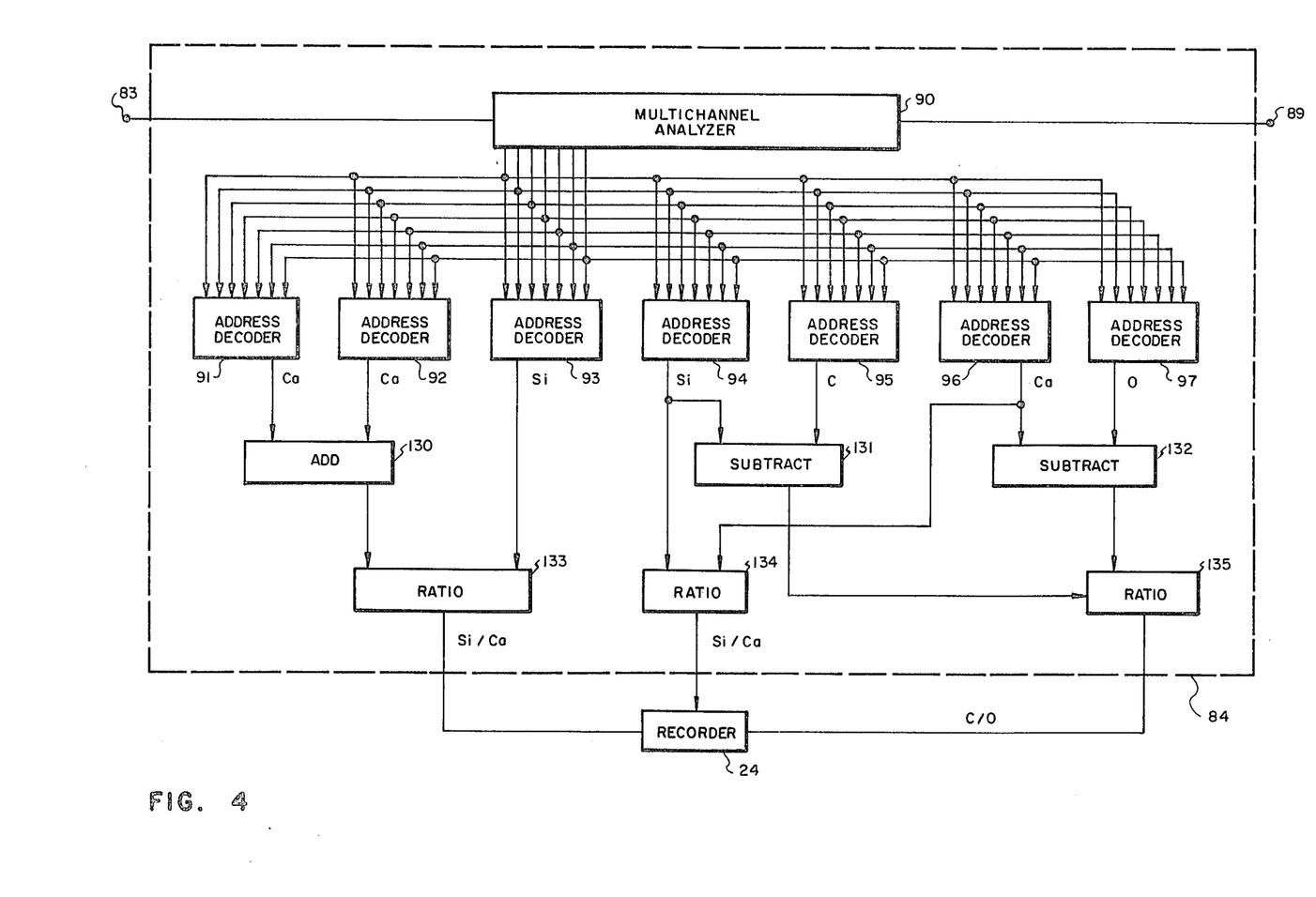
FIG. 4 is a block diagram showing in greater detail a portion of the surface circuitry illustrated in FIG. 3.

Referring now to FIG. 4, the surface timing circuitry 84 of FIG. 3 is shown in greater detail. The conductors 83 and 89, illustrated in FIG. 3, are coupled into a multichannel analyzer 90 having seven outputs which are each connected into seven address decoders identified by the numerals 91-97, respectively. The outputs of the address decoders 91 and 92 are coupled into an addition circuit 130. The outputs of address decoders 94 and 95 are coupled into a subtraction circuit 131. The output of address decoders 96 and 97 are coupled into a subtraction circuit 132. The output of addition circuit 130 and the output of the address decoder 93 are connected to a ratio circuit 133 whose output is recorded on the recorder 24. The output of address decoder 94 and the output of address decoder 96 are connected to a ratio circuit 134 whose output is recorded on the recorder 24. The output of the subtraction circuit 131 and the output of the subtraction circuit 132 are connected to a ratio circuit 135 whose output is recorded on the recorder 24.

Figure 6:
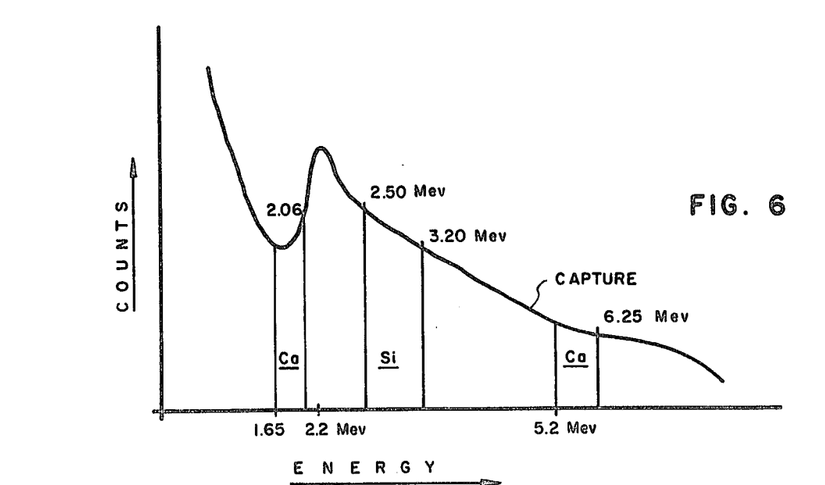
FIG. 6 graphically illustrates a spectral curve similar to that of FIG. 5 but showing the energy windows exemplary of the present invention.

The operation of the multichannel analyzer and the address decoders is explained in greater detail in U.S. Pat. No. 4,013,874 which issued on Mar. 22, 1977. In accordance with the present invention, the address decoder 91 is configured to measure pulses in the 1.65 to 2.06 Mev band. The address decoder 92 is configured to measure pulses in the 5.2 to 6.25 Mev band. The address decoder 93 is configured to measure pulses in the 2.50 to 3.20 Mev band. The windows for the address decoders 91, 92 and 93 are graphically illustrated in FIG. 6 which shows a typical thermal neutron capture curve following a neutron burst. The address decoders 94 and 95 are each configured to measure pulses in the 3.17 to 4.65 Mev band. The address decoders 96 and 97 are each configured to measure pulses in the 4.86 to 6.34 Mev band.

Figure 5:
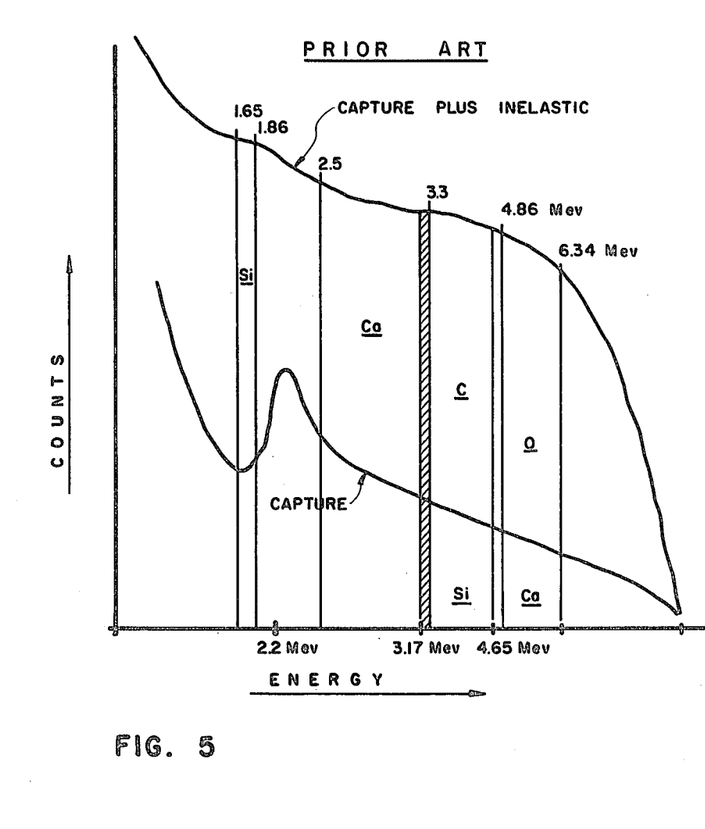
FIG. 5 graphically illustrates a portion of a spectral curve plotting radiation counts versus the energy levels of various high energy gamma rays utilizing the prior art energy windows.

In the operation of the circuitry of FIG. 4, it should be appreciated that the address decoders 94, 95, 96 and 97 provide information, respectively, with regard to the silicon, carbon, calcium and oxygen windows which are illustrated as being known in the prior art in accordance with FIG. 5. Thus, the ratio circuit 134 provides a silicon/calcium ratio, and the ratio circuit 135 provides a carbon/oxygen ratio, each of which is recorded on the surface recorder 24.

The output of the address decoder 91, being indicative of the energy window which encompasses a low energy calcium peak and the output of the address decoder 92, being indicative of an energy window which encompasses a higher energy calcium peak, are each connected to the addition circuit 130 wherein the counts from a pair of non-contiguous energy windows are summed. This sum is divided by the output of the address decoder 93 to provide a silicon/calcium ratio which is substantially unaffected by the salinity of the borehole. This ratio is then recorded on the recorder 24. The compensated Ca/Si ratio can be mathematically stated by the expression:

$$Ca/Si = (Ca^1 + Ca^2/Si),$$

where $Ca^1$ and $Ca^2$ are the counts from the non-contiguous energy windows and Si is from an intermediate window.

Referring now to FIG. 5, there is illustrated graphically a plot of radioactivity counts versus energy showing both a capture spectra and also a capture plus inelastic spectra, in addition to some prior art energy windows used in obtaining a Ca/Si ratio. As previously mentioned hereinbefore, there have been two methods used within the prior art for measuring the silicon/calcium ratio. One method has utilized the silicon capture window which is coincident with the inelastic carbon window and the calcium capture window which is coincident with the oxygen inelastic window.

Figure 7:
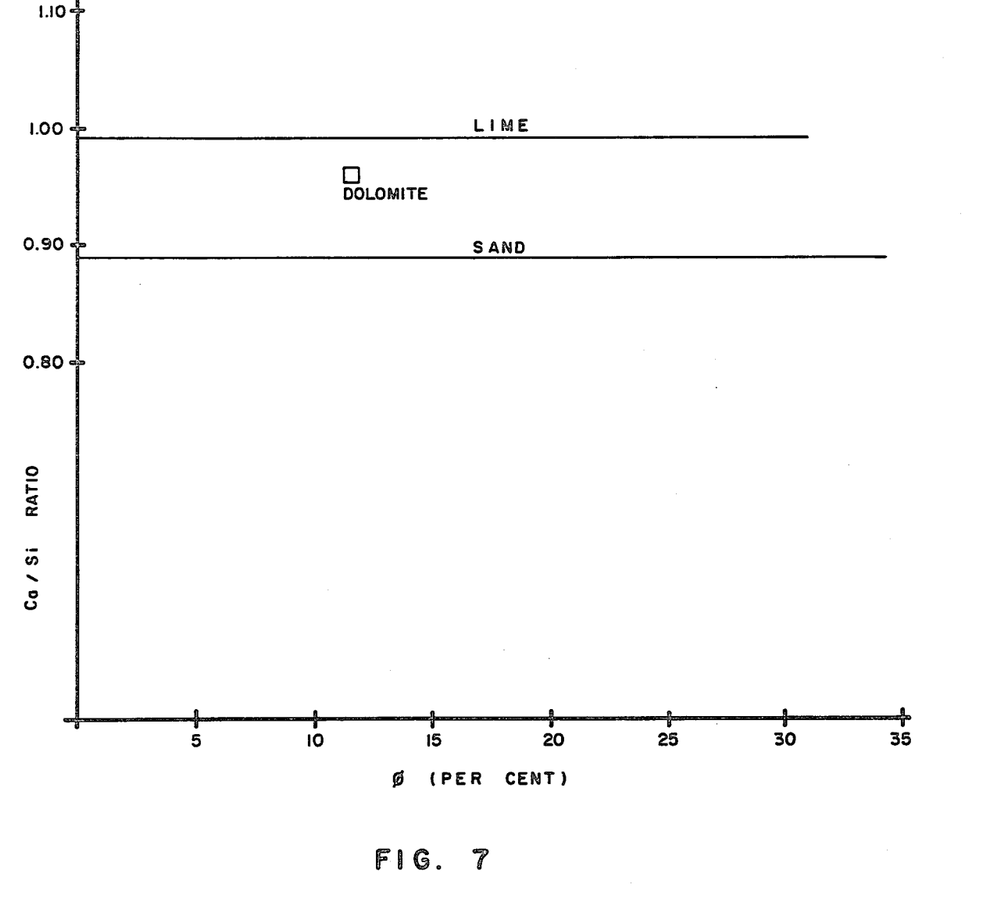
FIG. 7 graphically illustrates the close relationship between the plotted data indicative of limestone and sand when utilizing the inelastic prior art windows of FIG. 5.

The other well known method, as exemplified by U.S. Pat. No. 3,780,301, utilizes the silicon inelastic window which is found between 1.65 and 1.86 Mev and the calcium window which is found between 2.5 and 3.3 Mev. As shown in the graph of FIG. 5, the calcium inelastic window overlaps the carbon inelastic window. While the silicon/calcium ratio which is struck from the inelastic data is substantially independent of salinity, the difference between sandstone and limestone as determined by this ratio is very small. This is illustrated by the graph of FIG. 7 wherein the two data lines are very close together, which can result in an error in determining whether the data results from limestone or sandstone.

Figure 8:
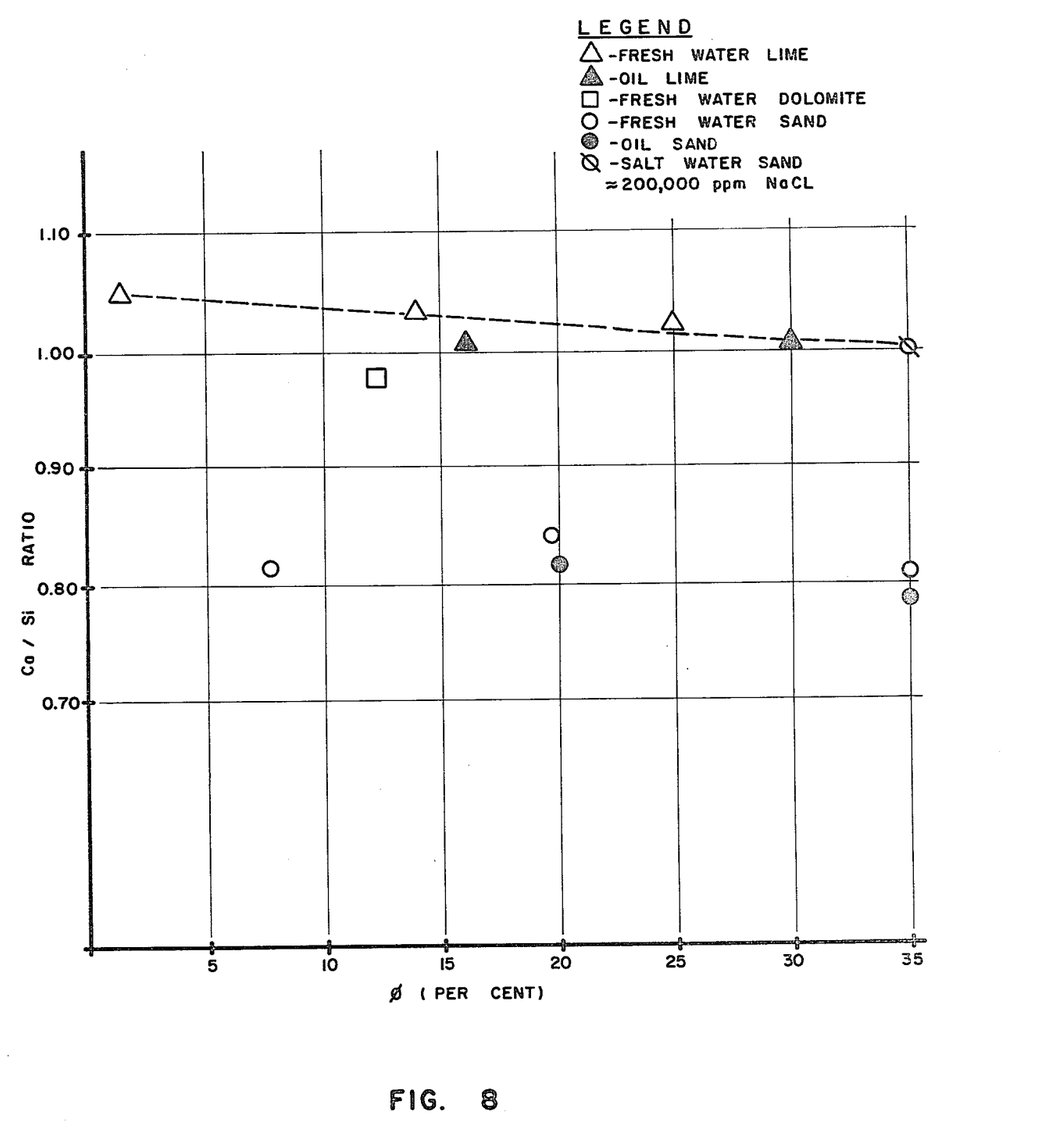
FIG. 8 graphically illustrates the salinity-sensitive nature of the lithology data using the prior art, thermal neutron capture windows of FIG. 5.

FIG. 8 illustrates data which was made using the prior art windows illustrated with respect to FIG. 5. This prior art method utilizes the same windows for the silicon capture and the carbon inelastic and for the calcium capture and the oxygen inelastic, respectively, which has been found to be highly sensitive to water salinity. As shown in FIG. 8, there is a marked difference between the salt water sand data, graphically near the fresh water limestone data, and the oil and fresh water sands. This graph clearly shows such measurements to be salt water sensitive.

Figure 9:
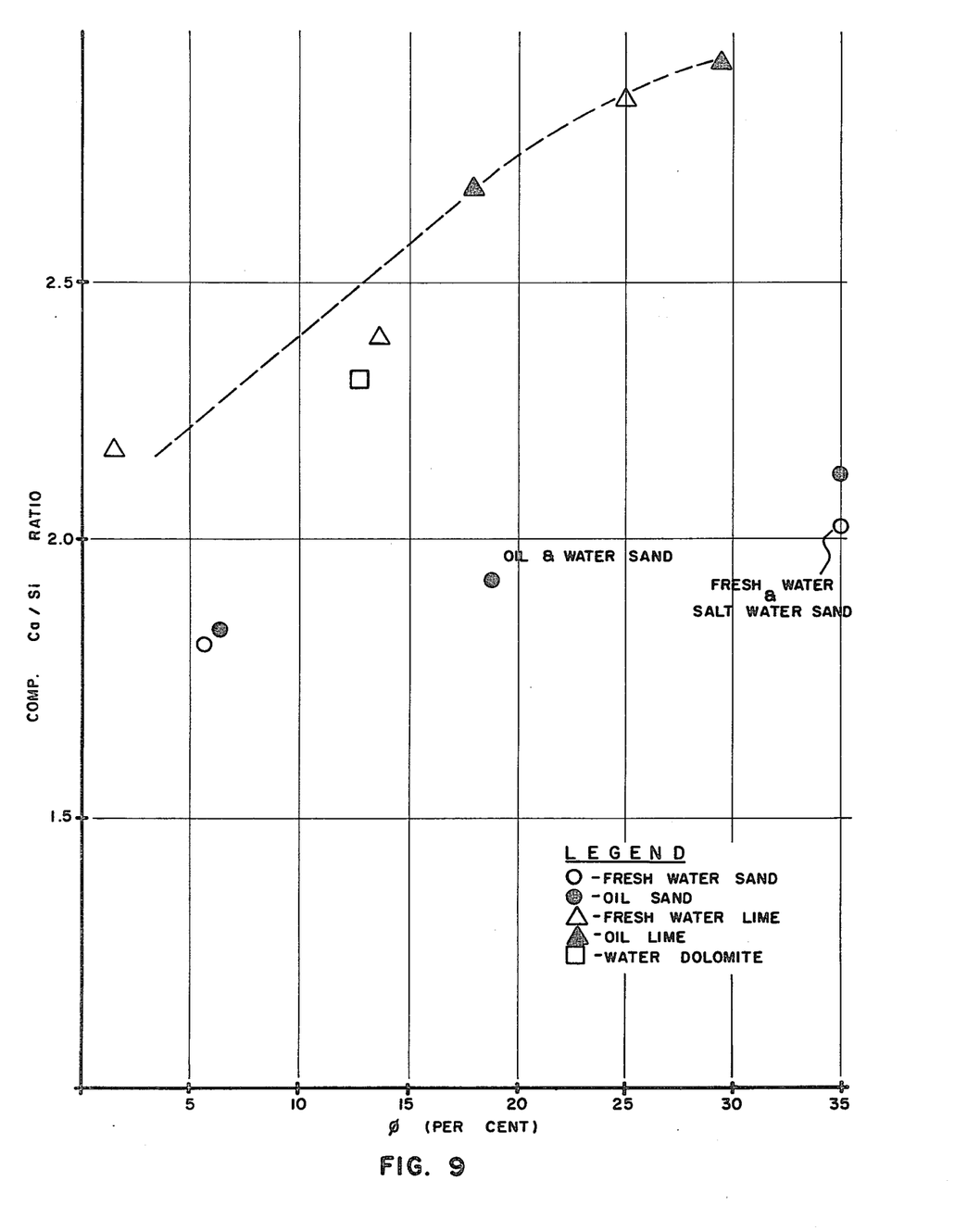
FIG. 9 graphically illustrates the non-salinity sensitive nature of the lithology data using the energy windows in accordance with the present invention.

In sharp contrast, the data graphically illustrated in FIG. 9 shows the fresh water and salt water sand data to be coincident at the high porosity level of 35% and is quite removed from the limestone data. The data of FIG. 9 was taken utilizing the address decoders 91, 92 and 93 in FIG. 4 in conjunction with the addition circuit 130 and the ratio circuit 133. Thus, the data taken in accordance with the present invention which utilizes a pair of non-contiguous energy windows for the calcium portion of the ratio and an intermediate silicon window for the silicon part of the ratio is found to be substantially insensitive to salinity.

An additional advantage of the present invention is apparent from the examination of the data of FIG. 9. The compensated calcium/silicon ratio in accordance with the present invention is sensitive to the porosity of the borehole environment. In areas where lithology is known, the ratio can be used to determine formation porosity.

Thus there has been described and illustrated herein a system in accordance with the present invention wherein new and improved method and apparatus are described which provide lithology and porosity data which is substantially insensitive to the borehole salinity. However, obvious variations will occur to those skilled in the art. For example, while it is sometimes advantageous to use a neutron source pulsed at a high frequency such as is described in the preferred embodiment, the principles of the invention can be utilized by using a lower frequency to pulse the neutron source and a correspondingly wider capture gamma ray detection interval, or by using a continuous source of neutrons as from an isotopic americium-beryllium source.

The embodiments of the invention in which an exclusive property or privilege is claimed are defined as follows:

1. A method of well logging, comprising the steps of:
   irradiating the formations surrounding an earth borehole with high energy neutrons;
   detecting radiations emanating from said formations being irradiated by said neutrons;

generating first electrical signals based upon said detected radiation relating to the calcium content of said formations;

generating second electrical signals based upon said detected radiation relating to the calcium content of said formations;

generating third electrical signals based upon said detected radiation relating to the silicon content of said formations;

generating fourth electrical signals functionally related to the sum of said first and second electrical signals; and generating fifth electrical signals functionally related to the ratio of said third and fourth electrical signals.

2. The method according to claim 1 wherein said first electrical signals are functionally related to detected gamma radiation coming within a first energy band and said second electrical signals are functionally related to detected gamma radiation coming within a second energy band which is non-contiguous to said first energy band.

3. The method according to claim 2 wherein said third electrical signals are functionally related to detected gamma radiation coming within a third energy band which is intermediate said first and second bands.

4. A method of well logging, comprising the steps of:

irradiating the formations surrounding an earth borehole with high energy neutrons;

detecting radiations emanating from said formations being irradiated by said neutrons;

generating first electrical signals based upon said detected radiation relating to the calcium content of said formations;

generating second electrical signals based upon said detected radiation relating to the calcium content of said formations; and generating third electrical signals based upon said detected radiation relating to the silicon content of said formations.

5. The method according to claim 4 wherein said first electrical signals are functionally related to detected gamma radiation coming within a first energy band and said second electrical signals are functionally related to detected gamma radiation coming within a second energy band which is non-contiguous to said first energy band.

6. The method according to claim 5 wherein said third electrical signals are functionally related to detected gamma radiation coming within a third energy band which is intermediate said first and second bands.

7. In a method for determining the silicon/calcium ratio of formations surrounding an earth borehole in which said formations are irradiated with high energy neutrons, gamma radiation is detected and first and second electrical signals are generated indicative of the silicon and calcium content, respectively, of said formation, the improvement comprising said second electrical signals being functionally related to the detected gamma radiation from two non-contiguous energy bands and said first electrical signals being functionally related to the detected gamma radiation from an energy band intermediate said two non-contiguous energy bands.

8. Apparatus for logging the formations surrounding an earth borehole, comprising:

an elongated well logging instrument adapted to traverse an earth borehole;

a source of neutrons within said instrument for irradiating the formations surrounding said borehole; and gamma radiation detector means for generating first electrical signals indicative of the silicon content of said formations and second electrical signals indicative of the calcium content of said formations, said second electrical signals being functionally related to gamma radiation coming within two non-contiguous energy bands.

9. The apparatus according to claim 8, including in addition thereto, means for providing a ratio of said first and second electrical signals.

10. The apparatus according to claim 8, wherein said first electrical signals are functionally related to gamma radiation coming within an energy band intermediate said two non-contiguous energy bands.

* * * * *